(12) United States Patent
Janson

(10) Patent No.: US 7,272,986 B2
(45) Date of Patent: Sep. 25, 2007

(54) DUAL INPUT AUTOMATIC TRANSAXLE

(75) Inventor: David Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 263 days.

(21) Appl. No.: 11/183,142

(22) Filed: Jul. 15, 2005

(65) Prior Publication Data

US 2007/0012128 A1   Jan. 18, 2007

(51) Int. Cl.
*F16H 3/30* (2006.01)

(52) U.S. Cl. ........................................ 74/340

(58) Field of Classification Search ................... 74/340
See application file for complete search history.

(56) References Cited

U.S. PATENT DOCUMENTS

| | | | |
|---|---|---|---|
| 2,616,301 A | 11/1952 | Tourneau | |
| 4,245,519 A | 1/1981 | Herlitzek | |
| 4,392,391 A | 7/1983 | Jameson et al. | |
| 4,428,247 A | 1/1984 | Young | |
| 4,549,443 A | 10/1985 | White | |
| 4,771,648 A * | 9/1988 | Bardoll | 74/359 |
| 4,802,373 A | 2/1989 | Saint-Jean et al. | |
| 4,823,639 A | 4/1989 | Krause et al. | |
| 5,471,892 A | 12/1995 | Sherman | |
| 5,524,500 A | 6/1996 | Rebholz et al. | |
| 5,743,142 A | 4/1998 | Leber et al. | |
| 5,787,756 A | 8/1998 | Leber et al. | |
| 5,819,587 A | 10/1998 | Leber et al. | |
| 6,513,399 B2 | 2/2003 | Lamela | |
| 6,675,668 B2 * | 1/2004 | Schamscha | 74/340 |
| 6,969,335 B2 * | 11/2005 | Lorken | 475/302 |
| 7,155,994 B2 * | 1/2007 | Gumpoltsberger | 74/340 |
| 7,197,954 B2 * | 4/2007 | Baldascini et al. | 74/331 |
| 2003/0015050 A1 | 1/2003 | Huber et al. | |
| 2003/0131686 A1 | 7/2003 | Huber | |
| 2003/0136209 A1 | 7/2003 | Huber | |
| 2005/0241424 A1 * | 11/2005 | Baldascini et al. | 74/331 |
| 2006/0032320 A1 | 2/2006 | Seo | |
| 2006/0266141 A1 | 11/2006 | Ogami | |

FOREIGN PATENT DOCUMENTS

| | | |
|---|---|---|
| EP | 1544505 | 6/2005 |
| EP | 1637770 | 3/2006 |

* cited by examiner

*Primary Examiner*—Ha D. Ho
(74) *Attorney, Agent, or Firm*—David B. Kelley; MacMillan, Sobanski & Todd, LLC

(57) ABSTRACT

A transaxle for a vehicle includes a first input shaft having a first speed drive gear, a third speed drive gear, and a reverse drive gear; and a second input shaft having a second speed drive gear. An output shaft has a first speed driven gear engaged with the first speed drive gear, a second speed driven gear engaged with the second speed drive gear, a third speed driven gear engaged with the third speed drive gear, a reverse driven gear, and a pinion adapted to engage with a differential. A reverse idler shaft has an idler input gear engaged with the reverse drive gear and an idler output gear, axially spaced from and rotationally fixed to the idler input gear and engaged with the reverse driven gear. Synchronizers selectively connect the first and second input shafts to the output shaft.

14 Claims, 2 Drawing Sheets

DUAL INPUT AUTOMATIC TRANSAXLE

BACKGROUND OF INVENTION

The present invention relates to automatic transmissions having a layshaft type of kinematic arrangement, and particularly to such automatic transaxles having dual input shafts.

Automatic transmissions in vehicles, which transmit power between an input and an output, either over a continuously variable range of speed ratios or in discreet step changes among speed ratios, have associated with them several sources of parasitic losses, which adversely affect fuel economy. These losses are associated with a torque converter, hydraulic friction clutches and breaks, hydraulic pump, and gear meshing. Moreover, these conventional automatic transmissions tend to be higher cost than is desirable.

To reduce costs and improve fuel economy in a motor vehicle having an automatic transmission, an automated shift manual (ASM) transmission can be used to eliminate or substantially reduce these parasitic losses except gear mesh losses. It is basically a transmission with a kinematic arrangement similar to a conventional manual transmission, but with gear changes actuated by an automated system rather than by driver intervention. An ASM transmission generally performs gear ratio changes by first interrupting torque transmitted from the engine to the transmission input, preparing the transmission components associated with the next gear ratio, and then restoring torque at the input. A significant drawback of ASM transmissions is the need to interrupt power transmitted from the engine to the transmission input shaft before or during each gear ratio change.

Another type of automatic transmission is a dual clutch layshaft transmission. Dual clutch layshaft transmissions are essentially two ASM transmissions combined into one, with a first input shaft from a first clutch providing power input to odd-numbered forward gears and a second input shaft from a second clutch providing power input to even-numbered forward gears. While operating in an odd-numbered gear, transmission components can be prepared for the next even-numbered gear. Consequently, shifts between odd-numbered and even-numbered forward gears can be accomplished with little or no power flow interruption.

The reverse function for these dual clutch layshaft transmissions is typically included in this kinematic arrangement by using sliding gear kinematics with spur gears that come into and out of mesh when shifting into and out of reverse, by extending the length of the input shafts and including the gears on this extended portion, or by employing two output shafts that have separate pinion gears mating with the ring gear of the differential. However, each of these arrangements has undesirable characteristics.

The spur gears employed with a sliding gear arrangement create undesirable noise problems and thus are not the most desirable of kinematic arrangements. Moreover, a mechanism is required to move the reverse gear into and out of engagement. In order to avoid these problems, it is preferable that constant mesh gears be employed for the entire kinematic arrangement.

Extending the length of one or both of the input shafts to accommodate a reverse gear set allows for the use of constant mesh gears, thus eliminating the noise problem. However, this may create problems packaging the transaxle in the engine compartment of the vehicle. Motor vehicles in which the front wheels are the driven wheels and the engine and transmission are located in a forward engine compartment generally require the engine and transmission to be arranged in a space whose lateral dimension is limited by the spacing between the front wheels. The engine compartments of such vehicles are both narrow and short, which creates an acute need to minimize the package space occupied by the transaxle, particularly in its lateral dimension. Thus, an arrangement with an extended input shaft to accommodate a reverse gear may cause interference between the transaxle and a component in the engine compartment, such as a frame rail of the vehicle.

The other option, which employs two output shafts with separate pinion gears, also has its drawbacks. The cost of the additional output shaft, extra pinion gear, and extra bearings and support structure to support the shaft can increase the cost of the transaxle more than is desired, as well as create other types of packaging concerns in the engine compartment.

Thus, it is desirable to have a kinematic arrangement for an automated manual type of transaxle having two input shafts where a constant mesh reverse gear arrangement is provided for while still minimizing the length of the input shafts.

SUMMARY OF INVENTION

According to an aspect of the invention, there is provided a multiple speed transaxle for a motor vehicle. The transaxle may include a first input shaft having a first speed drive gear, a third speed drive gear, and a reverse drive gear; and a second input shaft, rotatable independently of the first input shaft, and having a second speed drive gear. An output shaft has a first speed driven gear engaged with the first speed drive gear, a second speed driven gear engaged with the second speed drive gear, a third speed driven gear engaged with the third speed drive gear, a reverse driven gear, and a pinion adapted to engage with a differential. A reverse idler shaft has an idler input gear engaged with the reverse drive gear and an idler output gear, axially spaced from and rotationally fixed to the idler input gear and engaged with the reverse driven gear. A plurality of couplers selectively connects the first input shaft to the output shaft and the second input shaft to the output shaft.

According to another aspect of the invention, there is provided a multiple speed transaxle for a motor vehicle. The multiple speed transaxle may include a first input shaft having a first speed drive gear, a third speed drive gear, and a reverse drive gear, and wherein the first input shaft has a first end adapted to be driven by a power input, and a second opposed end spaced a first axial distance from the first end; and a second input shaft, rotatable independently of the first input shaft, and having a second speed drive gear. An output shaft has a first speed driven gear engaged with the first speed drive gear, a second speed driven gear engaged with the second speed drive gear, a third speed driven gear engaged with the third speed drive gear, a reverse driven gear, and a pinion adapted to engage with a differential, with the reverse driven gear spaced a greater axial distance from the first end than the second opposed end. A reverse idler is engaged between the reverse drive gear and the reverse driven gear. Also, the transaxle may include a plurality of couplers for selectively connecting the first input shaft to the output shaft and the second input shaft to the output shaft.

An advantage of an embodiment of the present invention is that the overall axial dimension of the input shafts of the transaxle is reduced sufficiently to accommodate the transaxle in a vehicle engine compartment without the transaxle interfering with a frame rail or other components in the engine compartment.

Another advantage of an embodiment of the present invention is that the kinematic arrangement allows for constant mesh gears not only for the forward speeds but also for the reverse speed as well. This reduces noise concerns as well as eliminates the need for a mechanism to bring any gears into and out of mesh with one another.

A further advantage of an embodiment of the present invention is that only one output shaft is required with its associated pinion, in order to provide a transaxle at a low cost.

DETAILED DESCRIPTION

Figure 1:
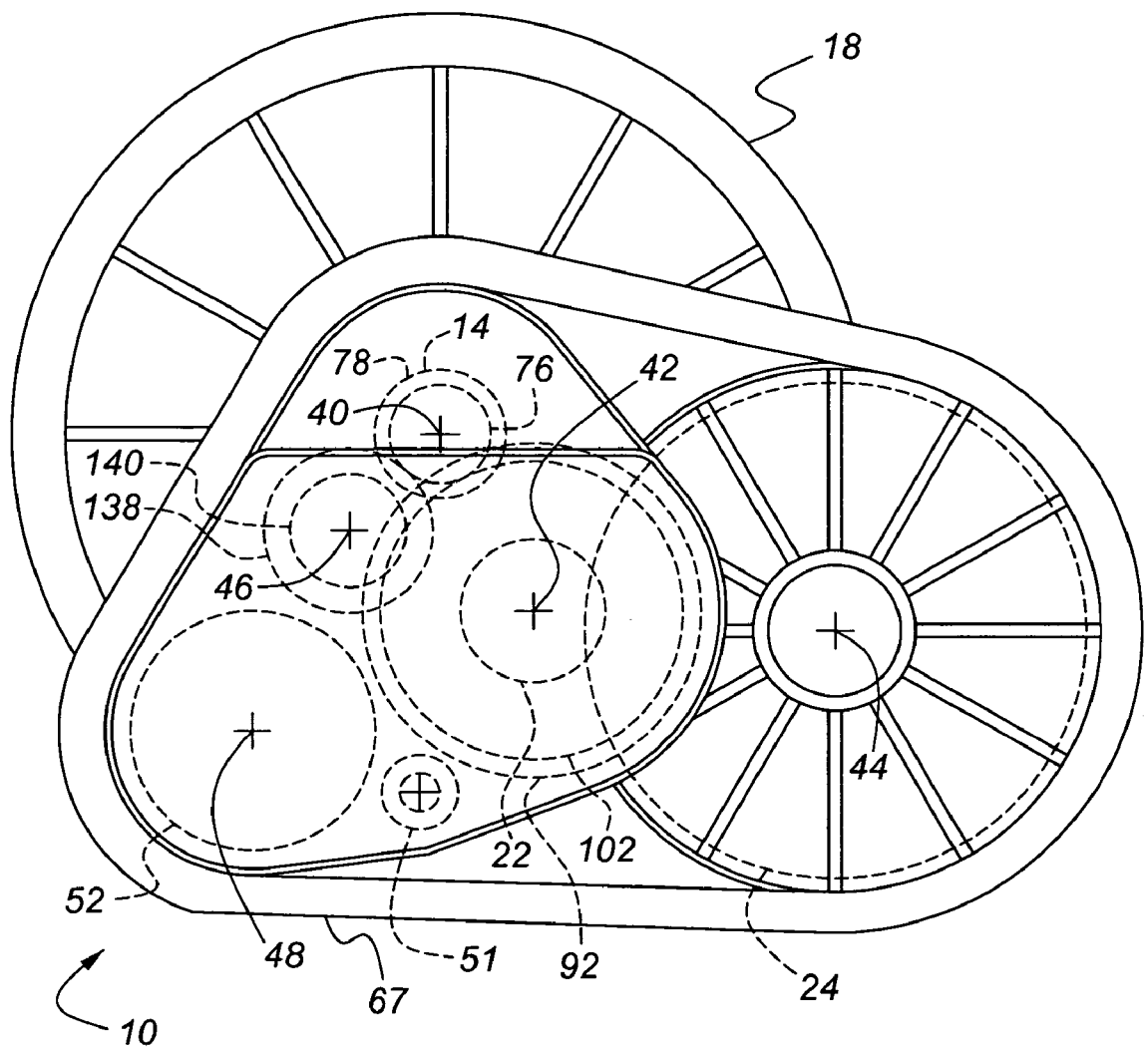
FIG. 1 is a schematic diagram of an end view of a transaxle in accordance with the present invention.
Figure 2:
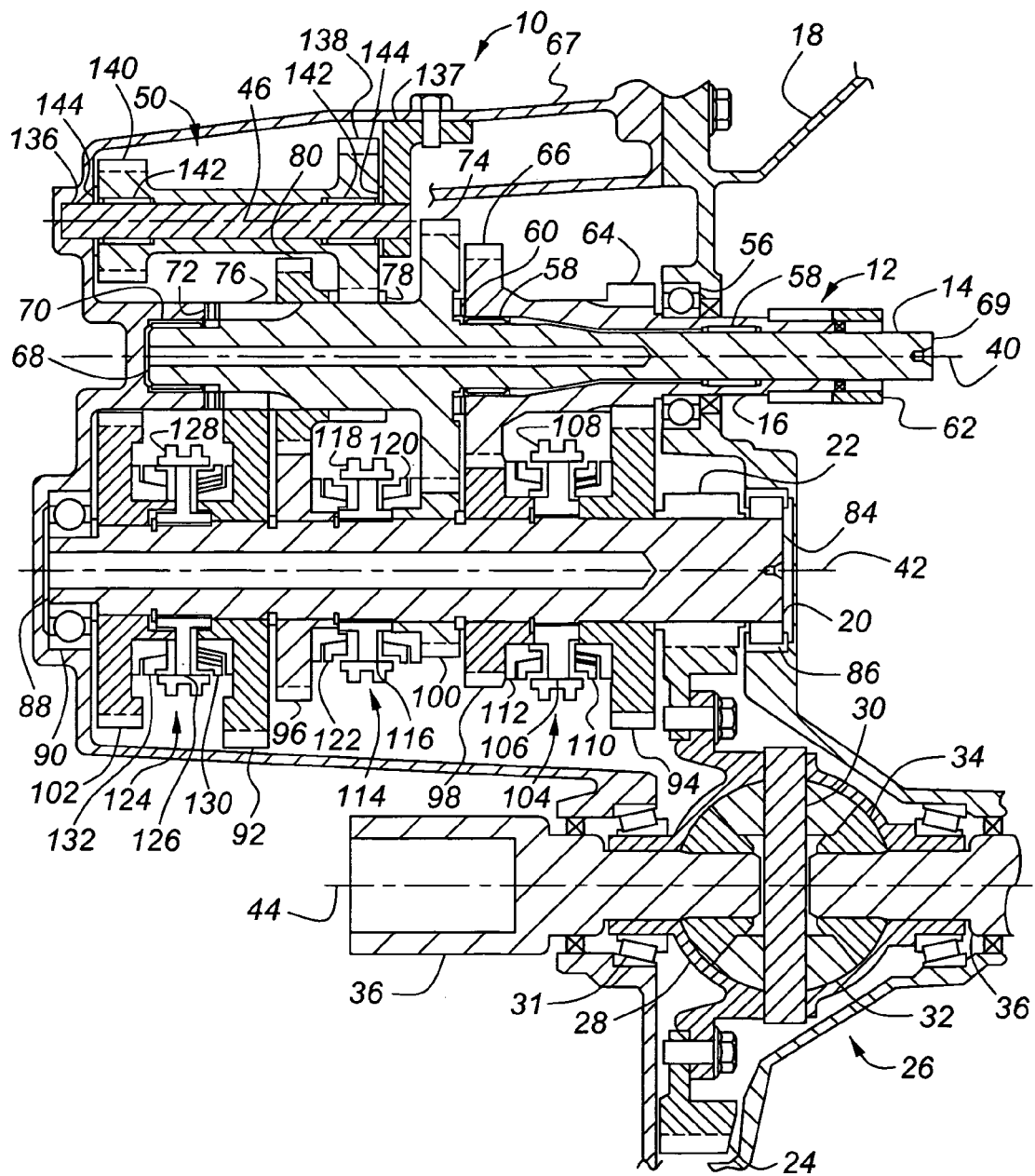
FIG. 2 is a schematically illustrated cross section of the transaxle in accordance with the present invention.

FIGS. 1-2 illustrate a transaxle, indicated generally at 10, for use in an automotive vehicle (not shown). The transaxle 10 includes an input shaft assembly 12, having a first input shaft 14 connected to and selectively drivable by a first clutch (not shown) and a second input shaft 16 connected to and selectively drivable by a second clutch (not shown). The first and second clutches may be enclosed in a clutch housing 18, and can be conventional dry or wet clutches driven by a known type of power source, such as an internal combustion engine or electric motor.

The transaxle 10 also includes an output shaft 20 with a pinion 22 that engages with a ring gear 24 of a differential 26. The differential 26 can be generally conventional and may include a differential case 28 and pinion shaft 30 supported on differential bearings 31 and driven by the ring gear 24. Pinion gears 32, in turn, drive axle side gears 34, which in turn drive axle shafts 36. The axle shafts 36 may be attached to half shafts (not shown), which may be conventional and drive a vehicle's drive wheels (not shown).

FIG. 1 is a schematic end view that illustrates the radial and spatial orientations of the various rotating shafts associated with the transaxle 10, each of which are generally parallel to the others. The input shaft assembly 12 rotates about an input shaft axis 40, with the output shaft 20 rotating about output shaft axis 42, which is located generally between the input shaft axis 40 and the rotational axis 44 of the differential 26. A reverse idler cluster 50 has a reverse idler axis of rotation 46 that allows for engagement with gears on both the first input shaft 14 and the output shaft 20. The transaxle 10 may also include a mechanism for actuating the synchronizers, such as a shift drum assembly 52, which may have a rotational axis 48, and a shift fork support rail 51. The shift drum assembly 52 and shift fork support rail 51 are not shown in detail herein since any automated mechanism for actuating synchronizers, discussed below, may be employed.

One will note from FIG. 1 that the kinematic arrangement of the transaxle 10 allows the output shaft 20 and the reverse idler cluster 50 to have axes of rotation 42, 46, respectively, that are below the axis of rotation 40 of the input shaft assembly 12. Moreover, one will note from FIG. 2 that the input shaft assembly 12 does not extend (on the end opposite the clutches) as far axially as the output shaft 20 and reverse idler cluster 50. Thus, for vehicles that may have structure, such as a frame rail (not shown), at the height of the input shaft assembly 12, the output shaft 20 and reverse idler cluster 50 may extend below this structure, while the input shaft assembly 12 is short enough axially to avoid interfering with it. Thus, engine compartment packaging concerns that may arise with other kinematic arrangements having constant mesh reverse gears are avoided.

FIG. 2 is a schematic section view through the transaxle 10, without the shift drum and clutches shown, where the shafts 12, 20, 36, 50 are shown as they actually align with each other axially, but have been rolled out radially and spatially so that all four shafts can be seen in the same view. That is, the differential 26 is shown below the output shaft 20, even though, as can be seen in FIG. 1, it is at about the same height as the output shaft 20. Also, the reverse idler cluster 50 is shown above the input shaft assembly 12 even though, as can be seen in FIG. 1, it is slightly below the input shaft assembly 12. This rolled out sectional view allows all of the transaxle components to be seen in the same view in order to more clearly show and describe the invention.

The second input shaft 16 is supported by the clutch housing 18 via bearings 56, and also by the first input shaft 14 via two pair of needle bearings 58 and a thrust bearing 60. A first end 62 of the second input shaft 16 is connected to and driven by the second clutch (not shown). The second input shaft 16 also includes a second speed drive gear 64 extending therefrom, and a fourth speed drive gear 66 extending therefrom. While the second and fourth drive gears 64, 66 are shown integral with the second input shaft 16, they may be formed separately and then mounted on the shaft, if so desired, as long as they are axially and rotationally fixed to the shaft 16.

The first input shaft 14 has a first end 69 that is connected to and driven by the first clutch (not shown). In addition to being supported by the bearings that mate with the second input shaft 16, the first input shaft 14 is supported by a transaxle housing 67 at a second end 68 by a bearing with a low profile design, preferably a needle bearing 70, and a needle thrust bearing 72. The needle bearing 70 is preferred over larger type bearing arrangements commonly used in order to assure that the transaxle housing 67 at the second end 68 of the first input shaft 14 does not interfere with a gear on the reverse idler cluster 50 engaging with a gear on the output shaft 20, as will be discussed below.

The first input shaft 14 also includes a fifth speed drive gear 74 extending therefrom, a first speed drive gear 76 (also shown in FIG. 1) recessed therein, a reverse drive gear 78 (also shown in FIG. 1) extending therefrom, and a third speed drive gear 80 that is mounted on the first input shaft 14 adjacent to the reverse drive gear 78. While the fifth, first, and reverse drive gears 74, 76, 78, respectively, are integral with the first input shaft 14, and the third speed drive gear 80 is shown as a separate component, they each may be integral or separately formed components, as desired, as long as they are axially and rotationally fixed to the input shaft 14.

One will note from the arrangement of gears on the first input shaft 14 and second input shaft 16 that the even numbered gears are driven off of one of the input shafts and the odd numbered gears are driven off the other of the input shafts. This arrangement allows for shifting between the forward gears with little or no interruption of torque. Such a kinematic arrangement is commonly referred to as a power shift transmission.

The output shaft 20 has a first end 84 that is supported on the clutch housing 18 by a bearing 86, and a second end 88 that is supported on the transaxle housing 67 by a bearing 90.

As discussed above, a pinion 22 extends from the output shaft 20. The pinion 22 may be integral with the output shaft 20 or formed separately and mounted thereon, so long as it is axially and rotationally fixed to the output shaft 20.

The output shaft 20 also includes a first speed driven gear 92 (also shown in FIG. 1), which is mounted on the shaft 20 for rotation relative to the shaft 20 and is engaged with the first speed drive gear 76. A second speed driven gear 94 is mounted on and rotatable relative to the output shaft 20 and is engaged with the second speed drive gear 64. A third speed driven gear 96 is mounted on and rotatable relative to the output shaft 20 and is engaged with the third speed drive gear 80. A fourth speed driven gear 98 is mounted on and rotatable relative to the output shaft 20 and is engaged with the fourth speed drive gear 66. A fifth speed driven gear 100 is mounted on and rotatable relative to the output shaft 20 and is engaged with the fifth speed drive gear 74. A reverse driven gear 102 (also shown in FIG. 1) is mounted on and rotatable relative to the output shaft 20, and is engaged with a gear on the reverse idler cluster 50, as will be discussed below.

Couplers, preferably synchronizers of the type used in automotive manual transmissions, selectively rotationally fix the driven gears 92, 94, 96, 98, 100, 102 to the output shaft 20 after synchronizing the rotational speed of the shaft 20 and that of the particular gear. The second and fourth speed driven gears 94, 98, which are both directly driven off of the second input shaft 16, are located on the output shaft 20 with a 2-4 synchronizer 104 located between them. The 2-4 synchronizer 104 includes a hub 106, which is splined to the output shaft 20, a sleeve 108, which rides on and is axially slidable relative to the hub 106 by a shift mechanism (not shown), and blocking rings 110, 112, which include conical surfaces that ride on corresponding conical surfaces on the respective driven gears 94, 98.

The third and fifth speed driven gears 96, 100, which are both directly driven off of the first input shaft 14, are located on the output shaft 20 with a 3-5 synchronizer 114 located between them. The 3-5 synchronizer 114 includes a hub 116, which is splined to the output shaft 20, a sleeve 118, which rides on and is axially slidable relative to the hub 116 by a shift mechanism, and blocking rings 120, 122, which include conical surfaces that ride on corresponding conical surfaces on the respective driven gears 96, 100.

The first and reverse speed driven gears 92, 102, are located on the output shaft 20 with a 1-R synchronizer 124 located between them. The 1-R synchronizer 124 includes a hub 126, which is splined to the output shaft 20, a sleeve 128, which rides on and is axially slidable relative to the hub 126 by a shift mechanism, and blocking rings 130, 132, which include conical surfaces that ride on corresponding conical surfaces on the respective driven gears 92, 102. While the first speed driven gear 92 is directly driven off of the first input shaft 14, the reverse driven gear 102 is driven off of the first input shaft 14 via the reverse idler cluster 50.

The reverse idler cluster 50 includes a rotationally fixed idler shaft 136, which is mounted to the transaxle housing 67. It may be mounted directly to a housing wall or, as shown here, one end of the shaft 136 may be mounted to a separate bracket 137. The reverse idler cluster 50 also includes an idler input gear 138 (also shown in FIG. 1) that is spaced from and rotationally fixed to an idler output gear 140 (also shown in FIG. 1). Needle bearings 142 are located between the gears 138, 140 and the idler shaft 136, and thrust washers 144 are located between the gears 138, 140 and the transaxle housing 67/bracket 137.

The reverse drive gear 78 on the first input shaft 14 engages the idler input gear 138. The idler output gear 140 engages the reverse driven gear 102 on the output shaft 20 (as can be seen in FIG. 1). While the idler output gear 140 does not appear to engage the reverse driven gear 102 in FIG. 2, that is because this section view is rolled out so that all of the transaxle components may be seen in this section view. As can be seen from this kinematic arrangement, the reverse idler cluster 50 is used to transfer torque for reverse drive from the first input shaft 14 to the end 88 of the output shaft 20—axially beyond the second end 68 of the first input shaft 14. There, the reverse driven gear 102 is engageable by the 1-R synchronizer 124 to drive the output shaft 20 in a reverse rotational direction.

Thus, the kinematic arrangement of this transaxle 10 produces five forward speeds, with powershifting, yet has only a single output shaft 20, constant mesh reverse gears, and a short input shaft. The single output shaft 20 minimizes the cost while avoiding other potential engine compartment packaging concerns. The short first input shaft 14, in combination with the needle bearing 70, allows the input shaft assembly 12, and hence the transaxle 10, to be packaged around an engine compartment feature, such as a frame rail (not shown) of the vehicle. Also, since the reverse gears 78, 102, 138, 140 stay in constant mesh, they can be helical gears, eliminating the noise concerns associated with spur gears, and eliminating any mechanism that would be needed to move the gears into and out of mesh with each other. Moreover, the two gear reverse idler cluster 50 allows for some of the overall reverse gear ratio to be obtained by the relative sizes of the two idler gears 138, 140, rather than all of the ratio being obtained between the reverse drive gear 78 and the reverse driven gear 102. This allows for a somewhat smaller reverse driven gear 102 than otherwise might be required, assuring that the reverse driven gear 102 does not interfere with the part of the transaxle housing 67 that supports the first input shaft 14 at its second end 68.

A further advantage of the kinematic arrangement of this transaxle 10 is that, by locating the reverse drive gear 78 on the first input shaft 14 adjacent to the third speed drive gear 80, the reverse drive gear 78 will be axially aligned with the 3-5 synchronizer 114. Since the ratio of the third and fifth gears is relatively small, the forces on the 3-5 synchronizer 114 are smaller than on the other synchronizers 124, 104 coupled to the first or second driven gears 92, 94, respectively. The smaller force allows for the use of a smaller synchronizer 114 at this location, thus allowing room for the reverse drive gear 78 without interference between the 3-5 synchronizer 114 and the reverse drive gear 78. Consequently, this kinematic arrangement has advantages over one where the driven gears are arranged to require a 1-3 or a 1-5 synchronizer.

The operation of the transaxle 10 will now be described with reference FIGS. 1 and 2. To produce the first forward speed, the first clutch (not shown) is engaged and the sleeve 128 of the 1-R synchronizer 124 is displaced axially toward the first speed driven gear 92. The displacement of the synchronizer sleeves 108, 118, 128 are preferably effected by an automated mechanism, such as the shift drum 52. As the sleeve 128 moves, it will cause the conical surface of the blocking ring 130 to frictionally engage the conical surface of the first speed driven gear 92, which causes the rotational speed of the gear 92 to synchronize with the rotational speed of the output shaft 20. The sleeve 128 continues to move axially until internal teeth on the sleeve 128 engage external teeth carried on the first speed driven gear 92, which is now rotationally fixed to the output shaft 20. The smaller first speed drive gear 76 on the first input shaft 14 now drives the much larger first speed driven gear 92 on the output shaft 20, creating a torque increase. The pinion 22 on the output shaft 20, in turn, drives the ring gear 24 of the differential 26, which transfers torque to the driving wheels (not shown) of the vehicle (not shown).

The second forward speed results by disengaging the 1-R synchronizer 124, axially displacing the sleeve 108 of the 2-4 synchronizer 104 to connect the second speed driven gear 94 to the output shaft 20, disengaging the first clutch, and engaging the second clutch (not shown). The second speed drive gear 64 of the second input shaft 16 now drives the second speed driven gear 94 output shaft 20. Similar operations are then performed to shift from second to third gear, third to fourth gear, and fourth to fifth gear.

The output shaft 20 is driven in the reverse direction by engaging the first clutch and sliding the 1-R sleeve 128 toward the reverse driven gear 102—to rotationally fix the reverse driven gear 102 to the output shaft 20. The reverse drive gear 78 on the first input shaft 14 will drive the idler input gear 138, and hence the idler output gear 140, on the reverse idler cluster 50. The idler output gear 140 will then drive the reverse driven gear 102 on the output shaft, which, of course, drives the pinion 22. Thus, the desired reverse gear ratio is achieved with constant mesh reverse gears.

While certain embodiments of the present invention have been described in detail, those familiar with the art to which this invention relates will recognize various alternative designs and embodiments for practicing the invention as defined by the following claims.

What is claimed is:

1. A multiple speed transaxle for a motor vehicle comprising:
   a first input shaft having a first speed drive gear, a third speed drive gear, and a reverse drive gear;
   a second input shaft, rotatable independently of the first input shaft, and having a second speed drive gear;
   an output shaft having a first speed driven gear engaged with the first speed drive gear, a second speed driven gear engaged with the second speed drive gear, a third speed driven gear engaged with the third speed drive gear, a reverse driven gear, and a pinion adapted to engage with a differential;
   a reverse idler shaft having an idler input gear engaged with the reverse drive gear and an idler output gear, axially spaced from and rotationally fixed to the idler input gear and engaged with the reverse driven gear; and
   a plurality of couplers for selectively driveably connecting die first input shaft to the output shaft and the second input shaft to the output shaft.

2. The multiple speed transaxle of claim 1, wherein the first input shaft includes a fifth speed drive gear, the second input shaft includes a fourth speed drive gear, and the output shaft includes a fifth speed driven gear engaged with the fifth speed drive gear and a fourth speed driven gear engaged With the fourth speed drive gear.

3. The multiple speed transaxle of claim 2 wherein the plurality of couplers includes a 1-R synchronizer selectively engageable with the first speed driven gear and the reverse driven gear, a 2-4 synchronizer selectively engageable with the second speed driven gear and the fourth speed driven gear, and a 3-5 synchronizer selectively engageable with the third speed driven gear and the fifth speed driven gear.

4. The multiple speed transaxle of claim 3 wherein the reverse drive gear is axially located between the third speed drive gear and the fifth speed drive gear.

5. The multiple speed transaxle of claim 4 wherein the first input shaft has a first end adapted to be driven by a power input, and a second opposed end spaced a first axial distance from the first end, and the idler output gear and the reverse driven gear are spaced a greater axial distance from the first end than the second opposed end.

6. The multiple speed transaxle of claim 3 wherein the 3-5 synchronizer is located axially between the 2-4 synchronizer and the 1-R synchronizer.

7. The multiple speed transaxle of claim 3 wherein the 3-5 synchronizer has a smaller overall diameter than the 1-R synchronizer and the 2-4 synchronizer.

8. The multiple speed transaxle of claim 2 wherein the reverse drive gear is axially located between the third speed drive gear and the fifth speed drive gear.

9. The multiple speed transaxle of claim 1 wherein the plurality of couplers are mounted on the output shaft.

10. The multiple speed transaxle of claim 1 wherein the first input shaft has a first end adapted to be driven by a power input, and a second opposed end spaced a first axial distance from the first end, and the idler output gear and the reverse driven gear are spaced a greater axial distance from the first end than the second opposed end.

11. The multiple speed transaxle of claim 1 further including a transaxle housing and wherein the first input shaft includes a first end adapted to be driven by a power input, and a second opposed end supported by a needle bearing mounted between the first input shaft and the transaxle housing.

12. The multiple speed transaxle of claim 1 wherein the idler input gear has a larger diameter than the idler output gear.

13. The multiple speed transaxle of claim 1 wherein the idler input gear is located to be in constant engagement wit the reverse drive gear and die idler output gear is located to be in constant engagement with the reverse driven gear.

14. A multiple speed transaxle for a motor vehicle comprising:
   a first input shaft having a first speed drive gear, a third speed drive gear, speed drive gear and a reverse drive gear, and wherein the first input shaft has a first end adapted to be driven by a power input, and a second opposed end spaced a first axial distance from the first end;
   a second input shaft, rotatable independently of the first input shaft, and having a second speed drive gear and a fourth speed drive gear;
   an output shaft having a first speed driven gear engaged with the first speed drive gear, a second speed driven gear engaged with the second speed drive gear, a third speed driven gear engaged with the third speed drive gear, a fourth speed driven gear engaged with the fourth speed drive gear, a fifth speed driven gear engaged with the fifth speed drive gear, a reverse driven gear, and a pinion adapted to engage with a differential, with the reverse driven gear spaced a greater axial distance from the first end than the second opposed end;
   a reverse idler shaft having an idler input gear in constant engagement with the reverse drive gear and an idler output gear, axially spaced from and rotationally fixed to the idler input gear and in constant engagement with the reverse driven gear; and
   a plurality of couplers for selectively driveably connecting the first input shaft to the output shaft and the second input shaft to the output shaft.

* * * * *